US008862381B1

(12) United States Patent
Ridl

(10) Patent No.: US 8,862,381 B1
(45) Date of Patent: Oct. 14, 2014

(54) AIR NAVIGATION OBSTACLE REPORTING AND NOTIFICATION SYSTEM

(76) Inventor: Kent S. Ridl, Duluth, MN (US)

( * ) Notice: Subject to any disclaimer, the term of this patent is extended or adjusted under 35 U.S.C. 154(b) by 242 days.

(21) Appl. No.: 13/227,545

(22) Filed: Sep. 8, 2011

(51) Int. Cl.

| | |
|---|---|
| ***G06F 17/10*** | (2006.01) |
| ***G06G 7/78*** | (2006.01) |
| ***G08G 1/16*** | (2006.01) |
| ***G05D 1/02*** | (2006.01) |
| ***F41G 9/00*** | (2006.01) |
| ***G08G 1/123*** | (2006.01) |
| *G01C 23/00* | (2006.01) |
| *G05D 3/00* | (2006.01) |
| *G06F 7/00* | (2006.01) |

(52) U.S. Cl.
USPC ........... 701/301; 701/300; 701/302; 701/532; 701/537; 701/3

(58) Field of Classification Search
USPC ............ 701/301, 300, 302, 532, 537, 3, 9, 14
See application file for complete search history.

(56) References Cited

U.S. PATENT DOCUMENTS

| | | | | |
|---|---|---|---|---|
| 4,196,474 | A | 4/1980 | Buchanan | |
| 5,410,728 | A * | 4/1995 | Bertiger et al. | 455/428 |
| 5,892,462 | A * | 4/1999 | Tran | 340/961 |
| 5,991,687 | A * | 11/1999 | Hale et al. | 701/470 |
| 6,021,374 | A * | 2/2000 | Wood | 701/301 |
| 6,219,618 | B1 * | 4/2001 | Bateman | 701/301 |
| 6,469,664 | B1 | 10/2002 | Michaelson | |
| 6,542,739 | B1 * | 4/2003 | Garner | 455/427 |
| 6,710,723 | B2 * | 3/2004 | Muller et al. | 340/970 |
| 6,747,577 | B2 * | 6/2004 | Chakravarty et al. | 340/945 |
| 6,850,187 | B1 | 2/2005 | Clark | |
| 7,120,445 | B2 * | 10/2006 | DeMarco et al. | 455/452.2 |
| 7,283,904 | B2 * | 10/2007 | Benjamin et al. | 701/117 |
| 7,372,400 | B2 * | 5/2008 | Cohen et al. | 342/357.29 |
| 7,479,920 | B2 * | 1/2009 | Niv | 342/65 |
| 7,551,990 | B2 | 6/2009 | Khatwa | |
| 7,908,077 | B2 * | 3/2011 | Smith et al. | 701/120 |
| 8,019,447 | B2 * | 9/2011 | Hoisington et al. | 700/31 |
| 8,073,578 | B1 * | 12/2011 | McCusker | 701/3 |
| 8,335,790 | B2 * | 12/2012 | Sauvalle et al. | 707/736 |
| 8,370,056 | B2 * | 2/2013 | Trombley et al. | 701/301 |
| 8,582,579 | B2 * | 11/2013 | Yousefi et al. | 370/395.42 |
| 2004/0222916 | A1 | 11/2004 | Smith | |
| 2005/0143918 | A1 | 6/2005 | Hilliard | |
| 2006/0031006 | A1 | 2/2006 | Stenbeck | |
| 2006/0154601 | A1 * | 7/2006 | Tewalt et al. | 455/12.1 |
| 2006/0238402 | A1 | 10/2006 | Khatwa | |
| 2008/0062039 | A1 * | 3/2008 | Cohen et al. | 342/357.01 |
| 2008/0243383 | A1 * | 10/2008 | Lin | 701/213 |
| 2009/0081947 | A1 * | 3/2009 | Margis | 455/3.02 |
| 2009/0140887 | A1 * | 6/2009 | Breed et al. | 340/990 |
| 2010/0004801 | A1 | 1/2010 | Flotte | |
| 2010/0217520 | A1 | 8/2010 | Stenbock | |
| 2012/0041951 | A1 * | 2/2012 | Sauvalle et al. | 707/737 |
| 2012/0072990 | A1 * | 3/2012 | Gutt et al. | 726/25 |

* cited by examiner

*Primary Examiner* — Nicholas Kiswanto
(74) *Attorney, Agent, or Firm* — Michael S. Neustel

(57) ABSTRACT

An air navigation obstacle reporting and notification system for providing a centralized obstruction notification system to aircraft pilots regarding unreported and/or unmarked obstructions. The air navigation obstacle reporting and notification system generally includes a plurality of users that enter obstacle data into a control server via a global computer network which are uploaded to and broadcast by a satellite unit. Navigation receivers within the aircraft receive the updated obstruction data and match this data with navigation data (e.g. GPS) to determine if the aircraft heading and altitude will result in a potential collision with an obstacle. If a potential collision risk exists, the pilot is notified visually and audibly by the navigation receiver.

18 Claims, 3 Drawing Sheets

AIR NAVIGATION OBSTACLE REPORTING AND NOTIFICATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to air navigation obstacle notification systems and more specifically it relates to an air navigation obstacle reporting and notification system for providing a centralized obstruction notification system to aircraft pilots regarding unreported and/or unmarked obstructions.

2. Description of the Related Art

Any discussion of the related art throughout the specification should in no way be considered as an admission that such related art is widely known or forms part of common general knowledge in the field.

The Federal Aviation Administration (FAA) has published requirements defining when an obstacle to aerial navigation (e.g. power line, telecommunication tower, wind turbine, etc.) must be reported to the agency. Many obstacles are sized or located such that they fall outside of reporting requirements, and collisions with such obstacles are becoming more frequent.

FAA guidelines also specify marking and lighting requirements for reportable obstacles to enhance a pilot's ability to see and avoid them. Although the FAA encourages marking and lighting compliance for unreportable obstacles, they do not mandate it. When used, the recommended paint schemes and other marking mechanisms are prone to deterioration over time, and lighting systems are frequently out of service. Even when maintenance is not a problem, these measures are often rendered inadequate because of weather conditions or unique terrain features.

Some aircraft are equipped with a terrain awareness and warning system (TAWS) to provide obstacle situational awareness to pilots, and ground-based systems such as the Obstacle Collision Avoidance System (OCAS) can provide pilots with additional warnings. One of the problems with current in-aircraft systems is that the obstacle databases only include information about obstacles that have been reported to and assessed by the FAA. Unfortunately, these obstacle databases are only updated on a limited schedule (at best, every 28 to 56 days), and maintenance of these databases is a manual, time-consuming process. Furthermore, unless an obstacle is significant enough in size and importance, companies are unlikely to spend the money required to equip an obstacle with a supplementary warning system such as OCAS.

Because of the inherent problems with the related art, there is a need for a new and improved air navigation obstacle reporting and notification system for providing a centralized obstruction notification system to aircraft pilots regarding unreported and/or unmarked obstructions.

BRIEF SUMMARY OF THE INVENTION

The invention generally relates to an air navigation system which includes a plurality of users that enter obstacle data into a control server via a global computer network which are uploaded to and broadcast by a satellite unit in near real time. Navigation receivers within the aircraft receive the updated obstruction data and match this data with navigation data (e.g. GPS) to determine if the aircraft heading and altitude will result in a potential collision with an obstacle. If a potential collision risk exists, the pilot is notified visually and audibly by the navigation receiver.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

The present invention can also be embodied as computer readable code on a computer readable medium. The computer readable medium is any data storage device that can store data which can be thereafter be read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

The present invention may be embodied within various languages and technologies such as but not limited to JAVA, JAVASCRIPT, JSCRIPT, WMLSCRIPT, ACTIVEX, CGI, scripts, plug-ins, BASIC, VISUAL BASIC, C, C++, COBOL, FORTRAN, PASCAL, ADA, HTML, DHTML, XML, SGML, WML, HDML, FLASH, SHOCKWAVE, GIF, JPEG, ADOBE ACROBAT, PDF, and MICROSOFT WORD. The present invention may be operated upon various operating systems such as but not limited to UNIX, MACINTOSH, LINUX, WINDOWS, PALMOS, WEBOS, IOS, ANDROID, EPOC, WINDOWS CE, FLEXOS, OS/9, and JAVAOS.

A. User Computers.

Figure 1:
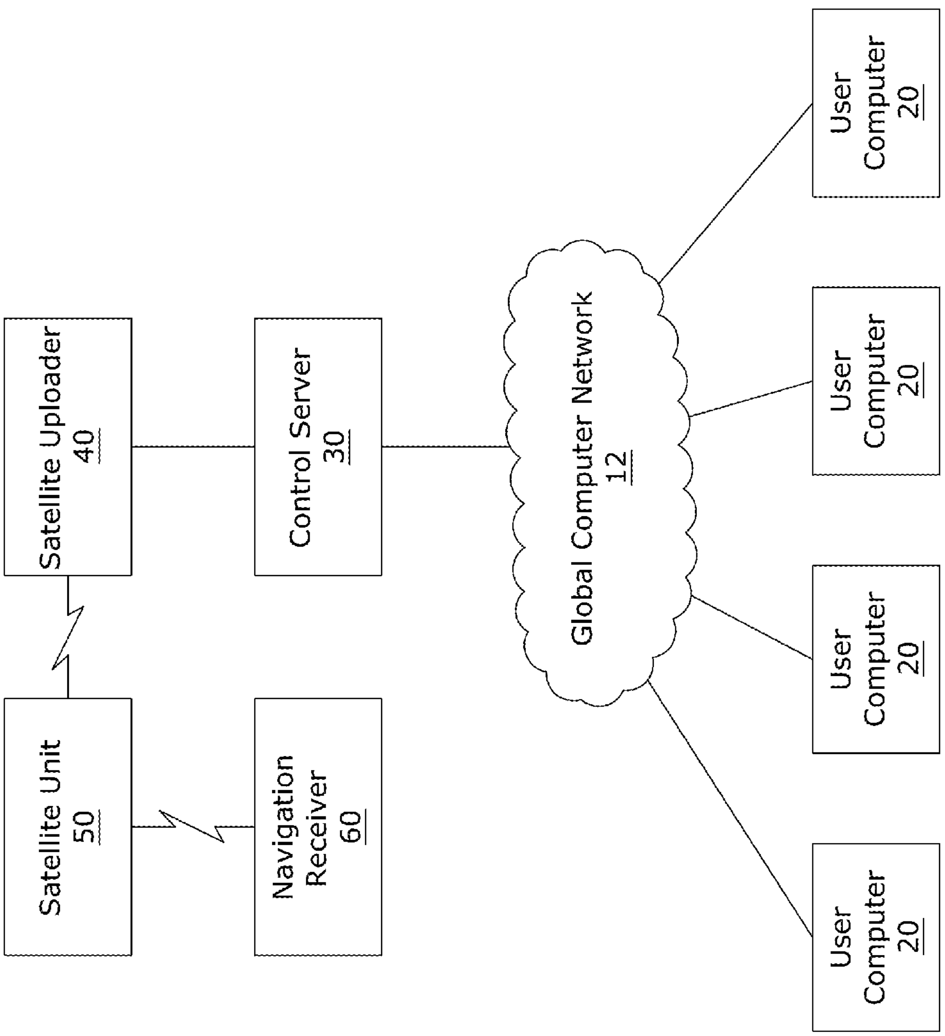
FIG. 1 is a block diagram illustrating the overall invention communication system.
Figure 2:
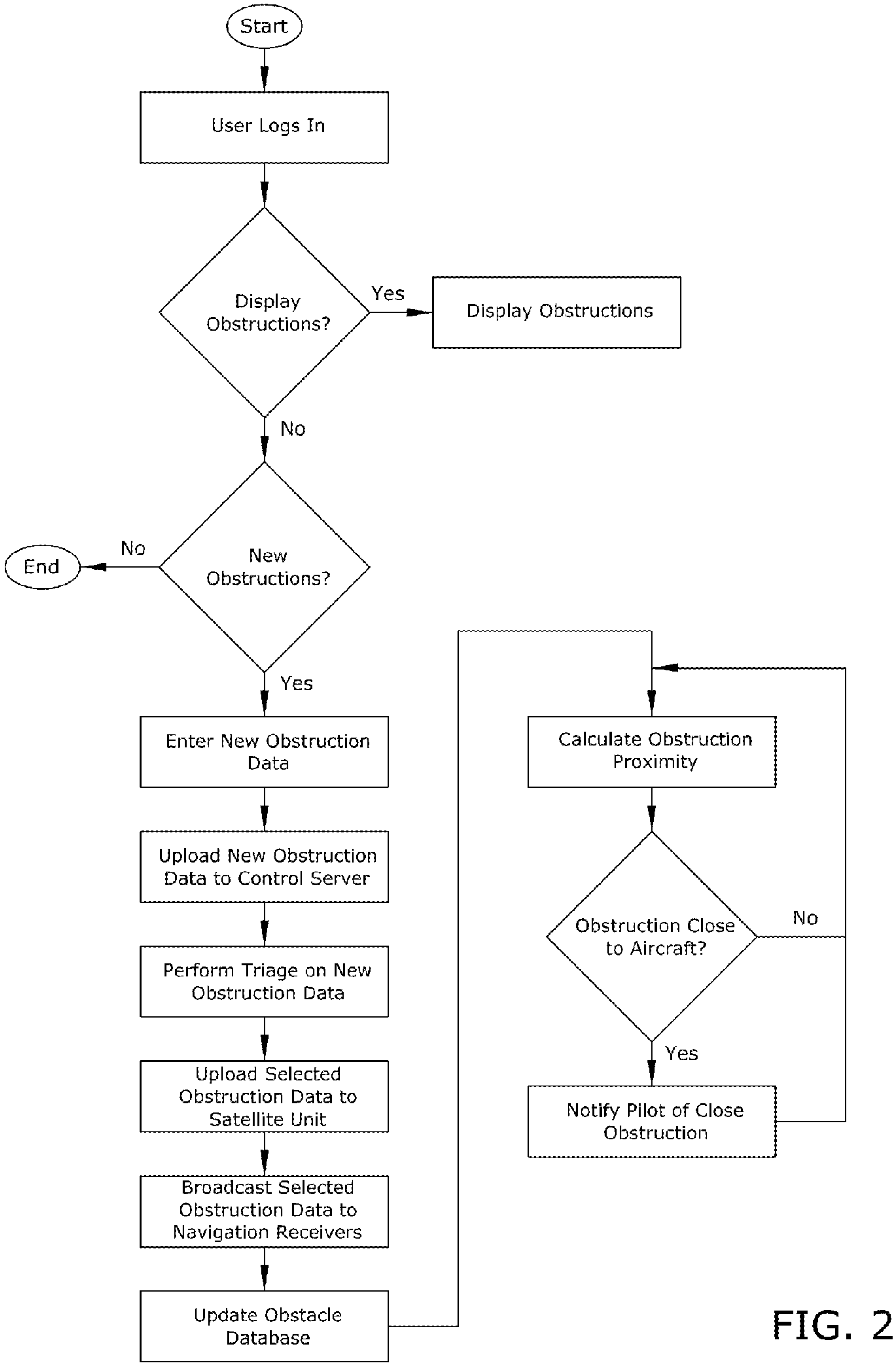
FIG. 2 is a flowchart illustrating the overall operation of the present invention involving entering, uploading and providing obstruction data.

As illustrated in FIG. 1, a plurality of user computers 20 are preferably in communication with the control server 30 via a global computer network 12. The user computers 20 are adapted to allow a user to enter new obstacle data into the user computers 20 and upload the new obstacle data to the control server 30. The new obstacle data is comprised of geographic coordinates to identify the geographical location of one or more obstacles (e.g. power line, tower, building, wind turbine, etc.) such as latitude and longitude coordinates. The new obstacle data may also include elevation information for the base of the obstacle and height information relating to the height of the obstacle. The obstacle data may be manually entered or automatically entered into the user computers 20 via a global positioning receiver that records the geographic coordinates of the obstacle.

The user computers 20 may be comprised of any conventional computer such as a personal computer (APPLE, IBM or compatible thereof), a workstation computer or various other types of computers (e.g. mobile phones, smart phones, personal digital assistants, handheld wireless devices, television units, cable television receivers, pagers, communication devices and the like). An exemplary user computer 20 preferably includes a display screen (or monitor), a printer, a disk drive, memory, a network interface, and a keyboard. The exemplary user computer 20 also preferably includes a microprocessor, a memory bus, random access memory (RAM), read only memory (ROM), a peripheral bus, and a keyboard controller. The microprocessor is a general-purpose digital processor that controls the operation of the user computer 20. The microprocessor can be a single-chip processor or implemented with multiple components. Using instructions retrieved from memory, microprocessor controls the reception and manipulations of input data and the output and display of data on output devices.

The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data.

Peripheral bus is used to access the input, output and storage devices used by the computer system. In the described embodiment(s), these devices include a display screen, a printer device, a floppy disk drive, a hard disk drive, and a network interface. A keyboard controller is used to receive input from the keyboard and send decoded symbols for each pressed key to microprocessor over bus.

The display screen is an output device that displays images of data provided by the microprocessor via the peripheral bus or provided by other components in the computer system. The printer device when operating as a printer provides an image on a sheet of paper or a similar surface. Other output devices such as a plotter, typesetter, etc. can be utilized in place of, or in addition to, the printer device.

The disk drive can be utilized to store various types of data. The microprocessor together with an operating system operate to execute computer code and produce and use data. The computer code and data may reside on RAM, ROM, or disk drive. The computer code and data can also reside on a removable program medium and loaded or installed onto computer system when needed. Removable program mediums include, for example, USB drive, CD-ROM, PC-CARD, floppy disk and magnetic tape.

The network interface circuit is utilized to send and receive data over a network connected to other computer systems and a global computer network 12. An interface card or similar device and appropriate software implemented by microprocessor can be utilized to connect the computer system to an existing network and transfer data according to standard protocols.

The keyboard is used by a user to input commands and other instructions to the computer system. Other types of user input devices can also be used in conjunction with the present invention. For example, pointing devices such as a computer mouse, a track ball, a stylus, or a tablet to manipulate a pointer on a screen of the computer system.

It is preferable that a web browser or a desktop application be installed upon the user computer 20 to login, access, enter data, download data and upload data with respect to the control server 30 (which also acts as a web server). Various types of web browsers may be utilized such as but not limited to MICROSOFT INTERNET EXPLORER, GOOGLE CHROME, APPLE SAFARI, OPERA, or FIREFOX. Browsers for handheld wireless devices, often times referred to as "microbrowsers", are also capable of implementing the present invention. A browser is typically capable of displaying/playing various types of content including but not limited text, graphic, audio and multimedia. Browsers have a graphical user interface called the browser window that displays the content and allows interaction of the user with the browser. Most graphical user interfaces have a periphery defined as the browser window, menu items, buttons, an address bar, vertical scroll bar, horizontal scroll bar, a content display and a lower information section. The browser window of the browser displays all or a portion of the content page to be viewed by the user such as but not limited to text, graphic, audio or multimedia. When the content is loaded into the browser, the upper-most portion of the content page is typically displayed within the browser window. The user typically scrolls through the content page as they read and view the content within the browser window until they reach the bottom-most portion of the content page. Even though the browser window of a conventional browser typically has a rectangular or square shape with four outer corners, various other shapes may be utilized to create the browser window. In addition, the browser window may be comprised of a graphical interface displayed upon a display device such as but not limited to a computer monitor, or the browser window may be comprised of the entire display device such as found upon many wireless devices.

B. Global Computer Network.

As shown in FIG. 1, the preferred communications network between the user computers 20 and the control server 30 is a global computer network (e.g. Internet). A plurality of computer systems around the world are in communication with one another via this global computer network 12 and are able to transmit various types of data between one another. The communications between the computer systems may be accomplished via various methods such as but not limited to wireless, Ethernet, cable, direct connection, telephone lines, and satellite.

The present invention may also be utilized upon global computer networks 12, local area networks (LAN), wide area networks (WAN), campus area networks (CAN), metropolitan-area networks (MAN), personal area network (PAN), and home area networks (HAN). Various protocols may be utilized by the electronic devices for communications such as but not limited to TCP, IP, UDP, SSH, HTTP, SMTP, FTP and WAP (Wireless Application Protocol). The present invention may be implemented upon various wireless networks such as but not limited to CDPD, CDMA, GSM, PDC, PHS, TDMA, FDMA, FLEX, REFLEX, IDEN, TETRA, DECT, DATATAC, and MOBITEX. The present invention preferably utilizes a global computer network 12 for transmitting data, however it can be appreciated that as future technologies are created that various aspects of the invention may be practiced with these improved technologies.

C. Control Server.

FIG. 1 illustrates the control server 30 in communication with the user computers 20 via the global computer network 12. The control server 30 receives, stores and transmits the obstacle data. The control server 30 is comprised of a web server capable of displaying web pages for the user computer 20 to enter data, upload data and download data. The control server 30 is also capable of displaying maps showing relevant obstacles for a pilot that can be viewed and/or printed. The obstacle data is stored within a database and can be accessed, modified, deleted and otherwise manipulated as desired.

The control server 30 is also in communication with the satellite uploader 40 as illustrated in FIG. 1 of the drawings. The control server 30 may communicate with the satellite uploader 40 via the global computer network 12 or other communication system as discussed previously.

The new obstacle data entered by the user computers 20 is preferably triaged to ensure that high priority and/or high risk obstacle data is uploaded to the satellite unit 50 and downloaded by the navigation receiver 60. Because of bandwidth limitations of the satellite unit 50, it is preferable to first have the high priority obstacle data provided to the navigation receivers 60 first and then lower priority obstacle data provided.

D. Satellite Uploader.

FIG. 1 further illustrates a satellite uploader 40 in communication with the control server 30 to receive the new obstacle data uploaded by the user computers 20. The satellite uploader 40 is comprised of a device capable of uploading the obstacle data to the satellite unit 50 (e.g. satellite antenna and control system). The new obstacle data is preferably uploaded to the satellite unit 50 at least every 24 hours to ensure the most up to date information available to the pilots. If the satellite uploader 40 is in continuous contact with one or more satellite units 50, new obstacle data can be uploaded and transmitted to pilots in near real time.

E. Satellite Unit.

The satellite unit 50 is comprised of a conventional space-based satellite capable of receiving and broadcasting data. The satellite unit 50 is in communication with the satellite uploader 40, wherein the satellite uploader 40 is adapted to upload the selected obstacle data to the satellite unit 50 and the satellite unit 50 is adapted to receive, read, store, and broadcast the selected obstacle data. The satellite unit 50 is adapted to broadcast the selected obstacle data via a data signal to the navigation receiver 60 which receives, stores, and uses the obstacle data for calculating an obstruction's proximity to the aircraft.

The satellite unit may be comprised of one or more satellites from multiple constellations, including but not limited to Global Positioning System (GPS), Wide Area Augmentation System (WAAS), other Global Navigation Satellite Systems (GNSS) and Space-Based Augmentation Systems (SBAS), and existing or future commercial satellite systems or other satellite communications platforms.

F. Space-Based Global Navigation Satellite System.

The space-based global navigation satellite system is a system that broadcasts a plurality of signals that are received and used by the navigation receiver 60 to calculate a geographic location of the aircraft that the navigation receiver 60 is utilized within. The geographic location of the aircraft is comprised of latitude, longitude, and altitude above the surface of Earth. The geographic location is comprised of a three-dimensional position representing the aircraft.

The space-based global navigation satellite system may preferably be comprised of a Global Positioning System (GPS); however, various other systems may be utilized instead or in addition to GPS including but not limited to Wide Area Augmentation System (WAAS), other Global Navigation Satellite Systems (GNSS), and other Space-Based Augmentation Systems (SBAS).

G. Navigation Receiver.

The navigation receiver 60 is positioned within an aircraft and is used to determine the geographic location, heading, and ground speed of the aircraft. The navigation receiver 60 is also utilized to warn the pilot of any potential risk obstacles the aircraft may encounter based on the geographic location and heading.

Figure 3:
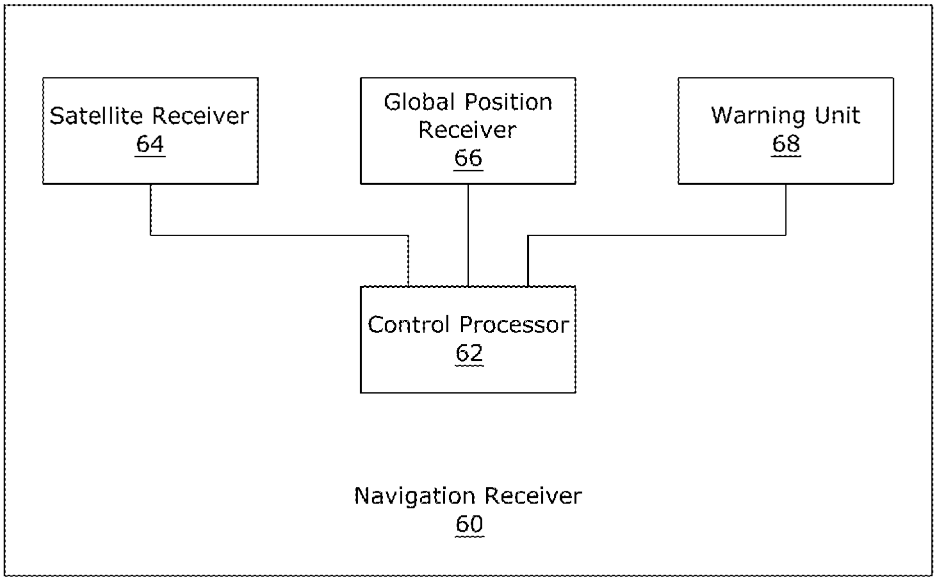
FIG. 3 is a block diagram of the navigation receiver.

The navigation receiver 60 includes a satellite receiver 64, a global position receiver 66, and a warning unit 68 as illustrated in FIG. 3 of the drawings. A control processor 62 within the navigation receiver 60 is in communication with the satellite receiver 64, a global position receiver 66, and a warning unit 68. The control processor 62 is basically a computer that receives, stores and transmits data. The control processor 62 selectively activates the warning unit 68 when the aircraft approaches an obstacle. The control processor 62 may also be in communication with a display that displays the location of the aircraft and surrounding obstacles.

The satellite receiver 64 is adapted to receive the data signal from the satellite unit 50 to update an obstacle database within the navigation receiver 60 with the selected obstacle data. The satellite receiver 64 is preferably comprised of any device capable of receiving data from the satellite unit 50. The obstacle database within the navigation receiver 60 is preferably automatically updated when the aircraft is operated.

The global position receiver 66 is adapted to receive the plurality of signals from the space-based global navigation satellite system to calculate a geographic position, a heading, and a velocity of the aircraft. The global position receiver 66 calculates the geographic position, heading, and velocity utilizing well-established technology.

The navigation receiver 60 compares the geographic position, velocity, and the heading of the aircraft to obstacles within the obstacle database stored within the navigation receiver 60 and emits an alarm to a pilot of the aircraft if a collision risk exists with a risk obstacle within the obstacle database. The determination of whether a warning should be emitted is based upon safety parameters chosen by the pilot and/or FAA (e.g. safe distance from an obstacle).

The warning unit 68 is preferably comprised of a speaker wherein the alarm is comprised of an audible alarm. The warning unit 68 also preferably is comprised of a display unit (e.g. LCD or LED screen display) wherein the alarm is comprised of a visual warning displayed on the display unit. The visual warning preferably includes a visual indication of the location of the aircraft and the risk obstacle. The warning unit 68 may first produce a visual warning and then an audible alarm, and vice versa.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An air navigation obstacle reporting and notification system, comprising:

a control server, wherein said control server is adapted to receive and store new obstacle data;

a satellite uploader in communication with said control server to receive said new obstacle data;

a satellite unit in communication with said satellite uploader, wherein said satellite uploader is adapted to upload selected obstacle data to said satellite unit and wherein said satellite unit is adapted to broadcast said selected obstacle data via a data signal;

a space-based global navigation satellite system that broadcasts a plurality of signals; and a navigation receiver positioned within an aircraft, wherein said navigation receiver includes a satellite receiver, a global position receiver and a warning unit, wherein said satellite receiver is adapted to receive said data signal from said satellite unit to update an obstacle database within said navigation receiver with said selected obstacle data, wherein said global position receiver is adapted to receive said plurality of signals to calculate a position and a heading of said aircraft, and wherein said navigation receiver compares said position and said heading of said aircraft to obstacles within said obstacle database and emits an alarm to a pilot of said aircraft if a collision risk exists with a risk obstacle within said obstacle database;

wherein said selected obstacle data is comprised of triaged obstacle data, wherein said satellite unit broadcasts high priority obstacle data before low priority obstacle data to said satellite receiver, wherein said high priority obstacle data is comprised of obstacles not assessed by the Federal Aviation Administration;

wherein said control server determines what obstacle data within said new obstacle data is said high priority obstacle data and said low priority obstacle data.

2. The air navigation obstacle reporting and notification system of claim 1, wherein said space-based global navigation satellite system is comprised of a global positioning system.

3. The air navigation obstacle reporting and notification system of claim 1, wherein said new obstacle data is comprised of geographic coordinates.

4. The air navigation obstacle reporting and notification system of claim 1, wherein said new obstacle data is comprised of geographic coordinates and elevation data.

5. The air navigation obstacle reporting and notification system of claim 1, wherein said collision risk exists if said heading and an altitude of said aircraft resulting in a path of said aircraft that is close to said risk obstacle.

6. The air navigation obstacle reporting and notification system of claim 1, wherein said warning unit is comprised of a speaker and wherein said alarm is comprised of an audible alarm.

7. The air navigation obstacle reporting and notification system of claim 1, wherein said warning unit is comprised of a display unit and wherein said alarm is comprised of a visual warning displayed on said display unit.

8. The air navigation obstacle reporting and notification system of claim 7, wherein said warning unit is comprised of a screen display.

9. The air navigation obstacle reporting and notification system of claim 8, wherein said visual warning includes a visual indication of said location of said aircraft and said risk obstacle.

10. An air navigation obstacle reporting and notification system, comprising:

a control server;

a plurality of user computers in communication with said control server via a global computer network, wherein said user computers are adapted to allow a user to enter new obstacle data into said user computers and upload said new obstacle data to said control server;

a satellite uploader in communication with said control server to receive said new obstacle data uploaded by said user computers;

a satellite unit in communication with said satellite uploader, wherein said satellite uploader is adapted to upload selected obstacle data to said satellite unit and wherein said satellite unit is adapted to broadcast said selected obstacle data via a data signal;

a space-based global navigation satellite system that broadcasts a plurality of signals; and a navigation receiver positioned within an aircraft, wherein said navigation receiver includes a satellite receiver, a global position receiver and a warning unit, wherein said satellite receiver is adapted to receive said data signal from said satellite unit to update an obstacle database within said navigation receiver with said selected obstacle data, wherein said global position receiver is adapted to receive said plurality of signals to calculate a position and a heading of said aircraft, and wherein said navigation receiver compares said position and said heading of said aircraft to obstacles within said obstacle database and emits an alarm to a pilot of said aircraft if a collision risk exists with a risk obstacle within said obstacle database;

wherein said selected obstacle data is comprised of triaged obstacle data, wherein said satellite unit broadcasts high priority obstacle data before low priority obstacle data to said satellite receiver, wherein said high priority obstacle data is comprised of obstacles not assessed by the Federal Aviation Administration;

wherein said control server determines what obstacle data within said new obstacle data is said high priority obstacle data and said low priority obstacle data.

11. The air navigation obstacle reporting and notification system of claim 10, wherein said space-based global navigation satellite system is comprised of a global positioning system.

12. The air navigation obstacle reporting and notification system of claim 10, wherein said new obstacle data is comprised of geographic coordinates.

13. The air navigation obstacle reporting and notification system of claim 10, wherein said new obstacle data is comprised of geographic coordinates and elevation data.

14. The air navigation obstacle reporting and notification system of claim 10, wherein said collision risk exists if said heading and an altitude of said aircraft resulting in a path of said aircraft that is close to said risk obstacle.

15. The air navigation obstacle reporting and notification system of claim 10, wherein said warning unit is comprised of a speaker and wherein said alarm is comprised of an audible alarm.

16. The air navigation obstacle reporting and notification system of claim 10, wherein said warning unit is comprised of a display unit and wherein said alarm is comprised of a visual warning displayed on said display unit.

17. The air navigation obstacle reporting and notification system of claim 16, wherein said warning unit is comprised of a screen display.

18. The air navigation obstacle reporting and notification system of claim 17, wherein said visual warning includes a visual indication of said location of said aircraft and said risk obstacle.

* * * * *